United States Patent
Wang et al.

(10) Patent No.: US 8,538,068 B2
(45) Date of Patent: Sep. 17, 2013

(54) EMBEDDING AND DETECTING HIDDEN INFORMATION

(71) Applicants: Donglin Wang, Beijing (CN); Shutian Yin, Beijing (CN); Yunming Zhang, Beijing (CN); Ningsheng Liu, Beijing (CN); Yuansong Liang, Beijing (CN); Changwei Liu, Beijing (CN); Peng Gao, Beijing (CN); Yongzhi Lou, Beijing (CN); De Ouyang, Beijing (CN)

(72) Inventors: Donglin Wang, Beijing (CN); Shutian Yin, Beijing (CN); Yunming Zhang, Beijing (CN); Ningsheng Liu, Beijing (CN); Yuansong Liang, Beijing (CN); Changwei Liu, Beijing (CN); Peng Gao, Beijing (CN); Yongzhi Lou, Beijing (CN); De Ouyang, Beijing (CN)

(73) Assignee: Sursen Corp., Beijing (CN)

( * ) Notice: Subject to any disclaimer, the term of this patent is extended or adjusted under 35 U.S.C. 154(b) by 0 days.

(21) Appl. No.: 13/629,599

(22) Filed: Sep. 27, 2012

(65) Prior Publication Data

US 2013/0028466 A1 Jan. 31, 2013

Related U.S. Application Data

(63) Continuation of application No. 12/050,055, filed on Mar. 17, 2008, now Pat. No. 8,311,265, which is a continuation-in-part of application No. PCT/CN2006/002409, filed on Sep. 15, 2006.

(30) Foreign Application Priority Data

Sep. 16, 2005 (CN) .......................... 2005 1 0103221

(51) Int. Cl.
*G06K 9/00* (2006.01)

(52) U.S. Cl.
USPC ..................................................... 382/100

(58) Field of Classification Search
USPC ............... 382/100, 232–253; 380/200–242; 358/3.28, 426.01–426.16; 348/384.1–440.1; 375/122, 240.01–240.29
See application file for complete search history.

(56) References Cited

U.S. PATENT DOCUMENTS

2004/0001606 A1* 1/2004 Levy .............................. 382/100
2004/0189682 A1* 9/2004 Troyansky et al. ........... 345/700

\* cited by examiner

*Primary Examiner* — Atiba O Fitzpatrick

(57) ABSTRACT

A novel method is disclosed for detecting hidden information in a document comprising characters, including: determining layout transformation for each character in the document for detection compared with the original document; obtaining a code sequence embedded in the document for detection based on the layout transformation of each character in the document for detection and the predetermined embedding rule; decoding the code sequence to get the hidden information embedded in the document for detection.

12 Claims, 4 Drawing Sheets

EMBEDDING AND DETECTING HIDDEN INFORMATION

CROSS-REFERENCE TO RELATED APPLICATION

The application is a continuation of U.S. patent application Ser. No. 12/050,055, filed on Mar. 17, 2008, which claims priority of PCT/CN2006/002409, filed on Sep. 15, 2006, which claims priority of Chinese patent application 200510103221.2, filed on Sep. 16, 2005, the entire contents of which are incorporated herein by reference.

BACKGROUND

Along with the growth of computer information technology, transmitting electronic files over networks is becoming more and more common. However, it is quite easy to copy, spread, or even tamper with electronic files. Therefore, the encryption/decryption technology in the cryptology is utilized for encrypting/decrypting the electronic files with software or hardware in order to ensure the security of the electronic files in transmission. Yet the encryption/decryption technology cannot protect decrypted electronic files from being copied and spread. In 1995, information hiding techniques were developed to solve the problem. For example, hidden information indicating certain attributes of an electronic file, e.g., copyright information, is inserted into the electronic file to protect and trace the electronic file when the file is being copied and spread. Among all information hiding techniques, digital watermark has been the focus in recent years.

In the digital watermark technique, hidden tags are embedded into digital multimedia data through signal processing; the tags are usually invisible/inaudible and can only be extracted with a dedicated detector or reader. The digital watermark technique is an important branch of the research on information hiding technique.

The information embedded into a piece of digital work shall possess the following features to be a digital watermark:
Imperceptibility: the embedded digital watermark should leave the piece of digital work nonobviously degraded and should be hard to perceive;
Security of the hiding position: the watermark information should be embedded directly into the file data, rather than into a header or wrapper, and the data should not be lost across varying data file formats; and
Robustness: the digital watermark shall be kept intact or well distinguishable after multiple unintentional or intentional signal processing procedures. Possible signal processing includes channel noise, filtering, digital/analog and analog/digital conversion, re-sampling, cropping, dodging, scaling, and lossy compression encoding.

Tradeoffs exist between the embedded data quantity and the robustness of a digital watermark in the digital watermark technique. An ideal watermark algorithm is expected to hide a large amount of data and yet be able to resist a variety of channel noise and signal distortion; however, in practical applications the two targets cannot be achieved at the same time. That problem does not affect the application of the digital watermark technique since normal applications usually focus on one of the two targets only. When the main purpose of an application is to make the digital watermark imperceptible in the communication, obviously the data quantity shall be of primary importance. Because of the extremely high imperceptibility of the digital watermark, it is hardly possible for the digital watermark to be attacked and manipulated by others. Therefore the robustness of the digital watermark is not highly important. On the other hand, when data security is of primary importance, the robustness of the digital watermark is critical because confidential data are facing the danger of theft and manipulation all the time, and the requirement for hidden data quantity will be secondary.

Typical digital watermark algorithms in the prior art convert both the information to be embedded and the target data into images. Some of the typical digital watermark algorithms are as follows.

The Least Significant Bit (LSB) algorithm, the digital watermark algorithm introduced by L. F. Turner and R. G. van Schyndel, is a typical information hiding algorithm in a spatial domain. According to the algorithm, random signals are generated from a specified secret key through an m sequence generator, arrayed into 2D watermark signals in accordance with certain rules, and inserted into the lowest bits of corresponding pixels in an original image. Since the watermark signals are hidden in the lowest bits as very weak signals superposed on the pixels, the watermark is hardly visible or audible. An LSB watermark can be detected by performing some operations on the image for detection and a watermarked image and making a statistical decision. Early digital watermark algorithms, e.g., Stego Dos, White Noise Storm, and STools, all belong to LSB-based algorithms. The LSB algorithm allows a large amount of hidden information; however, the hidden information can be removed easily and thus fails the requirement for digital watermark robustness. Therefore the LSB algorithm is seldom used by modern digital watermark software. Nevertheless, as a method for hiding a large amount of data, the LSB algorithm is still very important in hiding communication.

The patchwork algorithm, a digital watermark algorithm introduced by Walter Bender etc. in the MIT Media Lab, is mainly used for fake-proofing of printing bills. A patchwork digital watermark is hidden in a statistic characteristic of a specific image. The patchwork shows excellent performance concerning robustness and effectively resists cropping, grayscale correction, lossy compression, etc. The disadvantages of the patchwork include that it only allows a small amount of data, is sensitive to affine transform, and also is vulnerable to multiple copy averaging.

Texture block coding, which hides watermark data in the random texture patterns of an image, covers watermark information by utilizing the similarity between texture patterns. The algorithm resists filtering, compression, and distortion, but it needs human operators for the process.

The digital watermark algorithm in the Discrete Cosine Transform (DCT) domain, the most-studied digital watermark algorithm, shows outstanding performance concerning robustness and imperceptibility. The core idea of the algorithm is to superpose watermark information on the intermediate-low frequency coefficients in the DCT domain of an image. The reason for having the algorithm choose the intermediate-low frequency coefficients is that the human visual system is mostly sensitive to intermediate and low frequencies and, therefore, a hacker attempting to destroy the watermark will inevitably degrade the image quality to a great extent while normal image processing procedures usually leave the data in the intermediate-low frequencies intact. The core of compression algorithms such as JPEG and MPEG includes quantization in the DCT domain; hence, skillful integration of the watermarking and the quantization enables the watermark to resist lossy compression. In addition, a comparatively accurate mathematical model has been developed for the statistical distribution of the DCT domain coefficients from which the information quantity of a watermark can be estimated theoretically.

The direct sequence spread spectrum watermark algorithm is an application of spread spectrum communication technology in the digital watermark technique. Different from methods in conventional narrowband modulation communication, information in the spread spectrum technique is distributed in a very wide frequency band after spread spectrum coding modulation, which makes the information pseudorandom. The information receiver de-spreads with corresponding spread spectrum codes to retrieve the original information. The spread spectrum technique effectively resists interference and is highly secure; thus it is widely used for military applications. In fact, the spread spectrum technique can be regarded as a type of radio steganogram method. From the perspective of human perception rather than information theory, the spread spectrum technique is secure because the information to be transmitted is disguised as channel noise and thus hard to be distinguished. The spread spectrum watermark algorithm, similar to the spread spectrum technique, processes the watermark information through spread spectrum modulation and superposes the modulated information on the original data. With regard to the frequency band, the watermark information is spread across the whole spectrum and cannot be restored with normal filters. A large amount of noise must be added in all frequency bands to crack the watermark, which undoubtedly damages the quality of the original data to a great extent.

There are other transform domain digital watermark algorithms. Digital watermark algorithms in the transform domain are not limited to algorithms in the DCT domain or Fourier transform. All types of signal transform are acceptable as long as the transform hides watermark information well. In recent years, many researchers have tried wavelet transform or other time/frequency analysis to hide digital watermark information in a time/scale domain or time/frequency domain, and have yielded satisfactory results.

The major criteria used for evaluating a digital watermark algorithm include the following items.

Immunity to interference (robustness): The digital watermark technique requires robustness, i.e., a digital watermark should be able to resist attacks from a third party, normal data processing and transforming, and standard data processing and transforming. This means that even when a hacker knows that important information is hiding in the transmitted data, the hacker cannot extract the important information or destroy the watermark without seriously damaging the host data. A robustness test includes an active attack process to test a digital watermark for its dependence on data synchronization, the ability to resist various kinds of linear and nonlinear filtering, and the ability to resist other attacks such as geometrical transform.

Embedded information quantity: An algorithm should be able to embed enough specific identification information into a limited amount of original data.

Imperceptibility of the information (interference to the original information): Tradeoffs exist between the information quantity and the imperceptibility of a digital watermark. By increasing the information quantity of the watermark, the quality of a work into which the watermark information is embedded will certainly be degraded. An imperceptibility test evaluates the information quantity and the perceptibility provided by a digital watermark algorithm and determines the exact relation between the watermark information quantity and the data degradation. Indexes in signal processing, e.g., Signal to Noise Ratio (SNR) and peak SNR, as well as physiological models of human visual and audial systems, should be used for evaluating the quality of multimedia data including graphic and audio data otherwise, the evaluation lacks scientific accuracy. This is one of the basic rules for both digital watermark algorithms and data compression techniques.

Security: Security testing mainly evaluates the time needed to crack a digital watermark algorithm and the complexity of the cracking process, which are the main indexes for watermark security.

In the typical digital watermark techniques described above, the identification information, i.e., watermark information, is usually embedded through image processing, which is also suitable for applications including embedding identification information into media files such as images, video, and audio. The techniques regard the files as general streaming media or 2D media, and do not distinguish character information from other information. Frequency domain transform or time domain transform is usually adopted to process the images by transforming a part of the image information to which human eyes are insensitive, e.g., high-frequency information, to embed watermarks. The techniques are similar to data compression algorithms like the JPEG algorithm. Yet conventional digital watermark algorithms take none of the features of specific document types, e.g., an electronic document, into consideration and hence perform poorly in certain fields concerning immunity to interference. For example, in the transmission of electronic official documents, which are basically binary images without grayscale, conventional digital watermark algorithms will create the following two problems:

Quality degradation of the outputted document: Binary images are very sensitive to frequency domain transform while electronic official documents require high definition and are not suitable for full image transform.

Watermark information loss: Printed electronic official documents are most likely to be spread by duplicating while digital watermarks based on image detail transform are very sensitive to the interference in the duplication and scanning processes; watermark information will suffer great loss after the processes, or even more loss due to other interference generated in the spread process, such as pollution, cropping, and soaking, which possibly make the watermarks official documents.

Embodiments of the present invention provide a method for detecting embedded hidden information so that the hidden information can be extracted even when the file with embedded hidden information has been interfered with and transformed several times, e.g., duplicated or photographed with a digital camera.

A method is provided for detecting hidden information, wherein, a document for detection is formed by embedding hidden information in an original document by performing layout transformation on characters in the original document according to a predetermined embedding rule, and the method comprises:

determining layout transformation for each character in the document for detection compared with the original document;

obtaining a code sequence embedded in the document for detection based on the layout transformation of each character in the document for detection and the predetermined embedding rule;

decoding the code sequence to get the hidden information embedded in the document for detection.

The method for embedding and detecting hidden information in an electronic document shows excellent performance in resisting interference and can tolerate common interferences including duplicating, scanning, rubbing, soaking, blotting, cropping, and photographing with digital cameras.

Although characters are used as examples to illustrate the applications of the above methods in the rest of the text, such methods are also applicable by one with ordinary skill in the art to words, letters, strokes, and other lexical elements present in an electronic document.

DETAILED DESCRIPTION

Figure 1:
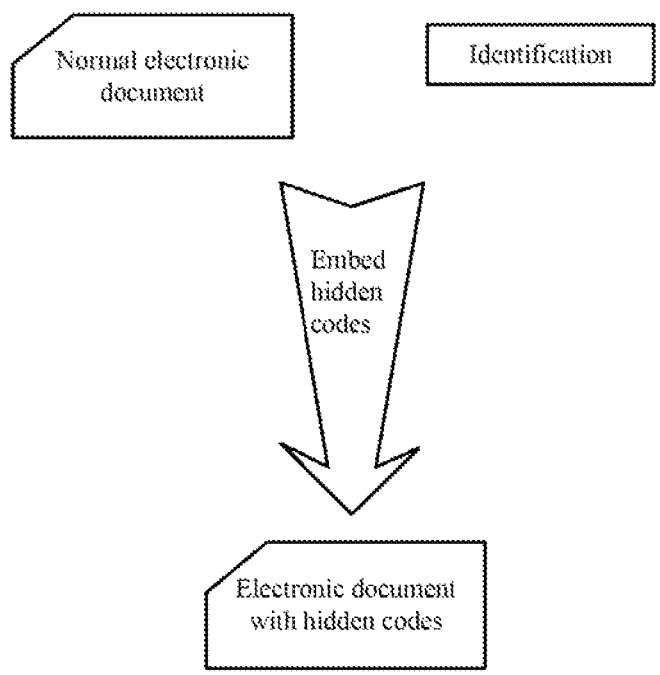
FIG. 1 is an example of a schematic diagram of the method provided for embedding hidden codes.

A detailed description of the embodiments is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A number of concepts employed by the application are explained herein so that a detailed description of the embodiments of of the application can be better understood.

Layout-based file: a type of file that decides the printing and display of page elements by describing the visual appearance, including positions, sizes, and shapes of visible elements (characters, figures, and images) in a document. Compared with content-based files, e.g., WORD documents, printing plates, PPT documents, Excel documents, and AutoCAD documents, the layout-based files are simpler since only layout information is recorded. All types of printable content-based files can be converted into layout-based files.

Redundancy coding: attaching redundant data, which are the integration of original data, to the original data. When the original data is damaged or modified in transmission due to various accidents, a part of or all of the original data can be restored by checking the redundant data or performing a calculation based on the redundant data.

OCR: Optical Character Recognition technique, which is used for obtaining the code and position of a character or characters by recognizing and analyzing the character or characters in an image.

In some embodiments, additional information is embedded into a document including characters as hidden codes by slightly modifying the layout (including size, layout position, and font) of the character(s) in the document. The additional information may be slight transformation to the characters (including numbers).

All information shall be coded before being embedded into the document; ultimately all information is embedded into the document as codes. Each class of a character layout transformation can be used separately to hide the information alone. Therefore, for the document including characters, each class of the layout transformation is regarded as a channel and all channels may embed hidden information in parallel. Provided the information to be embedded into the document includes 3 separate numbers, 9, 8 and 7, the number 9 can be embedded into the channel of character size transformation; the number 8 can be embedded into the channel of character position transformation while the number 7 can be embedded into the channel of character font transformation. Or one of the 3 numbers 9, 8 and 7 can be embedded into each of the 3 channels, so that the channels may be used for verifying each other to improve the stability of the hidden information.

Redundancy coding, e.g., the Bose-Chaudhuri-Hocguenghem (BCH) algorithm or Reed-Solomon (RS) algorithm, may be adopted for coding the hidden information to improve error tolerance and anti-interference capability.

The character layout transformation includes transformation of an appearance of a single character in the document, e.g., changes in the size, position, or font of the character. The changes in the character size include changes in the width or height or both the width and height of the character; the changes in the character position include changes in the vertical position or horizontal position or both the vertical and horizontal positions of the character; the changes in the character font include changes in any one or any combination of the following items: stroke lengths, stroke shapes, relative position of the strokes, stroke widths, and stroke slopes.

The layout transformation levels are different for each channel based on practical needs; hence the coding pattern adopted for each channel shall vary n accordance with the layout transformation levels. For example, in the channel of character size transformation, when 2 levels, enlarged and unchanged, are available, the coding pattern of the channel will be binary; when 4 levels, enlarged by ⅓ inch, enlarged by ⅕ inch, unchanged, and shrunk by ⅕ inch, are available, the coding pattern for the channel will be quaternary. When a channel adopts binary codes and the information to be embedded is the number 9, the hidden codes to be embedded will be 1001, i.e., the document should include at least 4 characters in order to hide the complete information.

A basic condition for detecting hidden codes is that both the party who intends to detect the hidden codes and the party who has embedded the hidden codes know rules for embedding the hidden codes, especially the layout transformation levels of each channel used in the embedding process and coding rules for different coding patterns. For example, when a channel provides 2 levels of layout transformation, the coding pattern for the channel will be binary and the length of the codes will be fixed at 4 bits; therefore, the corresponding hidden code of the to-be-embedded number 9 is 1001 and corresponding hidden code of the to-be-embedded number 2 is 0010.

After the party who intends to detect the hidden codes and the party who has embedded the hidden codes have been ensured that both parties have a common understanding concerning the rules for the embedding process, the document for detection is scanned and then goes through the OCR to be converted into an electronic file in the same format as the original document. The document for detection includes a hard copy of the document or a fragment of the hard copy.

When the document for detection is converted into the same format as the original document, the converted document for detection is compared with the original document to determine the corresponding position of each character of the document for detection in the original document. Assuming that the original document includes 1000 characters and the document for detection is a fragment of the original document containing only 5 characters, e.g., "group," the fragment shall be compared with the original document to find the position of the "group" in the original document. If the 5 characters "group" matches the 177th to 181st characters in the original document, it can be determined that the 5 consecutive characters "group" is in the position of characters from No. 177 to No. 181 in the original document.

When the positions of the characters from the document for detection are determined in the original document, the layout differences between each character in the document for detection and the corresponding character in the original document can be analyzed, and every recognized difference will be given a transformation number. For example, the 5 characters "group" in the document for detection is compared one by one with the characters from No. 177 to No. 181 in the original document. Assume the rules for embedding includes the channel of character size transformation, 2 levels of layout transformation, i.e., enlarged and unchanged, representing 1 and 0, respectively, and a fixed code length at 4 bits. The results of the comparisons performed by the computer for the 5 characters are unchanged, unchanged, enlarged, enlarged, and unchanged, and therefore the code sequence obtained from the comparison results is 00110. According to the rules for embedding, the fixed code length is 4 bits, 4×44=176, so it is learned that the position where the hidden codes are embedded begins at the 177th character of the original document, i.e., "g" of the 5 characters "group," and therefore the embedded hidden code is 0011.

In one embodiment, the layout transformation in the document for detection is recognized to obtain transformation numbers by a human operator or by the combined efforts of a computer and a human operator; in the latter case, the comparison results generated by the computer are further reviewed by the human operator and potential errors are modified. In the example given above, if the comparison result generated by the computer is 00111, and the human operator recognizes the comparison result "1" for the fifth character as an error, then the human operator may change the "1" into "0."

In a special embodiment, the same information (integer) is embedded into all channels of a document including characters. In this embodiment, multiple hard copies of the document are printed, and a different hidden code is embedded into each different hard copy. But for a hard copy, the information embedded into all channels of the hard copy is the same, so every hard copy of the document can be traced and the confidential information can be protected.

FIG. 1 is a schematic diagram of the method provided for embedding hidden codes. The hidden code algorithm provided includes two parts—one used for embedding hidden codes and one used for detecting hidden codes. The part for embedding hidden codes is designed to solve two problems. One of the problems is the design of hidden codes. The hidden codes indicate the identification to be embedded into the electronic document. Different integers are used by the algorithm as the identification of different objects, i.e., one integer is embedded into one document as the hidden code to indicate the uniqueness of the document. The maximum value of the integer indicates the support recognition accuracy, e.g., the maximum integer value of 65536 indicates that a specific document can be recognized among 65536 documents with different transformations. The length of hidden codes, i.e., identification, decides the length of the space taken by the identification in the document with the embedded hidden code. The longer the identification is, the more information (characters) will be selected from the document with the embedded code for identification detection. The other problem is the embedding method, which should well balance the imperceptibility and robustness of hidden codes. A simpler embedded hidden code affects the document less and offers better imperceptibility; however, a simpler embedded hidden code is more vulnerable to interference and less robust; on the other hand, a complicated hidden code resists interference and is robust, yet the complicated hidden code affects the original document and offers poorer imperceptibility. The design of the embedding algorithm includes layout transformation selection, parameter configuration, and coding algorithm design and will be explained in detail herein.

Figure 2:
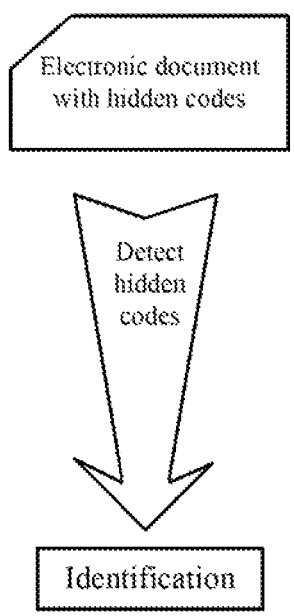
FIG. 2 is an example of a schematic diagram of the method provided for detecting hidden codes.

FIG. 2 is a schematic diagram of the method provided for detecting hidden codes. The method for detecting hidden codes is designed in accordance with the process of embedding codes. The result of the detection may either be recovering the original hidden codes, i.e., the embedded identification, or obtaining a result based on the statistical approach, i.e., a possible range of hidden codes when no individual identification can be decided, which will be explained hereafter. The aim of the detection is to minimize the probability of error and missing codes in the detection result.

Figure 3:
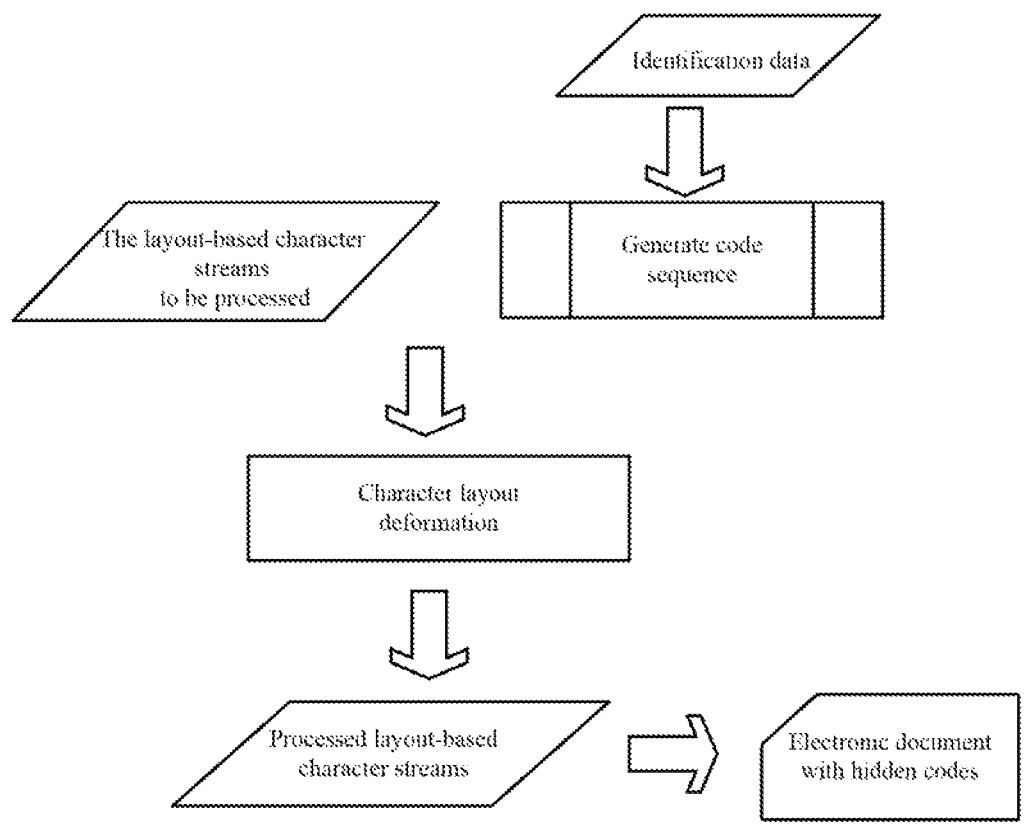
FIG. 3 is an example of a flow chart of the method provided for embedding hidden codes.

FIG. 3 is a flow chart of the method provided for embedding hidden codes, including the following steps.

Step 1: determine the number N of the document copies into which hidden codes will be embedded, i.e., the number N of object spaces that need different identifications to be distinguished from each other. Different identifications are embedded into different copies of the documents as hidden codes so that each copy can be recognized according to the hidden code within.

Step 2: choose the layout transformation, which includes transformation of individual characters in the document. Layout transformation is divided into a number of classes, and each class of layout transformation is regarded as a channel and includes a number of levels. The number of levels determines a parameter that indicates the base of coding in the algorithm for embedding. For example, when the transformation of character size includes 3 levels, i.e., enlarged, unchanged, and shrunk, the corresponding parameter in the algorithm for embedding should be 3.

The following classes of layout transformation can be applied to an individual character in the document:

Slightly change the size of an individual character in the layout-based file, e.g., modify the size of the characters, such as enlarge, shrink, or crop a character, or zoom a character in or out to be horizontally and vertically out of proportion.

Slightly change the position of an individual character, e.g., modify the position of a character in the page layout, such as move the character horizontally, vertically, or toward a random direction.

Distort an individual character according to a customized font that is only slightly different from the original font used in the document. The difference may lie in stroke width, stroke angle, relative position of strokes, distance between character radicals or any combination of the above.

Step 3: choose the characters that need to go through layout transformation and decide the number of such characters, code the identification to be embedded into the document copy, and transform the layout of the characters based on the coded identification, i.e., hidden codes. Once the coding scheme is determined, the identification to be embedded into the document copy is coded based on the coding scheme. Provided there is only one class of layout transformation, i.e., only one channel, and there is M object spaces that need to be distinguished from each other, i.e., M document copies that need different hidden codes, and the coding without redundancy coding has N as its base, in which N is the sub levels of a class of the layout transformation, e.g., when N fonts are used in character font transformation, the transformation will includes N levels and corresponding coding will have N as its base. In such case, the minimum number of characters that needs the layout transformation is $\lfloor \log N(M-1) \rfloor + 1$, which requires the document to include at least $\lfloor \log N(M-1) \rfloor +1$ characters. If the document into which hidden codes need to be embedded includes K characters, $\lfloor \log N(M-1) \rfloor +1$ codes can be applied to the K characters in a cyclic application, in which the codes can be embedded for $K/\{\lfloor \log N(M-1) \rfloor +1,\}$ times, to produce a document with embedded hidden codes.

For example, when the number of document copies into which hidden codes are embedded is 9 and the codes are binary (2 levels of character layout transformation), i.e., 0 for unchanged and 1 for enlarged by 1/300 inch, therefore M=9, N=2 and $\lfloor \log 2(9-1) \rfloor +1=4$, indicating that the length of the codes is 4 bits. That means, when there are 2 levels of character layout transformation and 9 document copies need to be distinguished from each other, the document has to include at least 4 characters. Provided the document includes 8 characters, so the hidden codes can be embedded twice, i.e., 8/4=2, the codes are embedded into 4 characters each time and the embedding process repeats for two times to embed the codes into all 8 characters to provide a document copy with embedded hidden code. For instance, the embedded hidden code sequence 01010101 in a document copy indicates that the 1st, 3rd, 5th and 7th characters are kept unchanged and the 2nd, 4th, 6th, and 8th characters are enlarged by 1/300 inch.

According to the method for embedding, the code length for each channel can be calculated with the expression $\lfloor \log N(M-1) \rfloor +1$ which means the document has to include at least $\lfloor \log N(M-1) \rfloor +1$ characters. The value N may vary for different channels, e.g., the character size transformation channel includes 2 levels, i.e., enlarged and unchanged, so the N for the character size transformation channel is 2; the character horizontal deviation channel includes 3 levels, i.e., deviated to the left, unchanged, and deviated to the right, so the N for the character horizontal deviation channel is 3.

In the Step 3, multiple channels can be adopted for transforming characters based on codes, and every code indicates a class of transformation applied to a character, e.g., character size transformation is one class of transformation and character horizontal deviation is another class of transformation. Each class of character layout transformation is regarded as a channel. Multiple channels, multiple classes of layout transformation, can be applied to one character. For example, a character can be enlarged and the font of the character can be changed at the same time, and the two channels can be isolated from each other in the detection if the two channels do not interfere with each other. The final result of the detection can be narrowed down by having an intersection of the detection results for different channels. Different classes of layout transformation have different characteristics concerning anti-interference capacity. For example, character font transformation well resists the interference produced by folding the hard copy but is vulnerable to blurring, while character size transformation is vulnerable to the interference produced by folding the hard copy but can well resist blurring. Hence by adopting a multiple channels coding (transformation) scheme, several kinds of interference can be resisted.

A redundancy coding scheme, e.g., BCH algorithm and RS algorithm, which are quite advanced in the field of communications technology, can be adopted to create redundancy for the codes in order to correct errors in the detection. Both the BCH algorithm and the RS algorithm add several bits of redundant codes, which record attributes of valid identifications, to the tail of the valid identification bits. When errors emerge in the valid identifications due to interference, the attributes recorded in the redundant codes can be used for restoring the valid identifications. The BCH algorithm is suitable for binary coding channels (which include only 2 levels of character layout transformation), and the RS algorithm is suitable for m-ary coding channels.

Electronic documents with hidden codes are produced through the steps described above.

Figure 4:
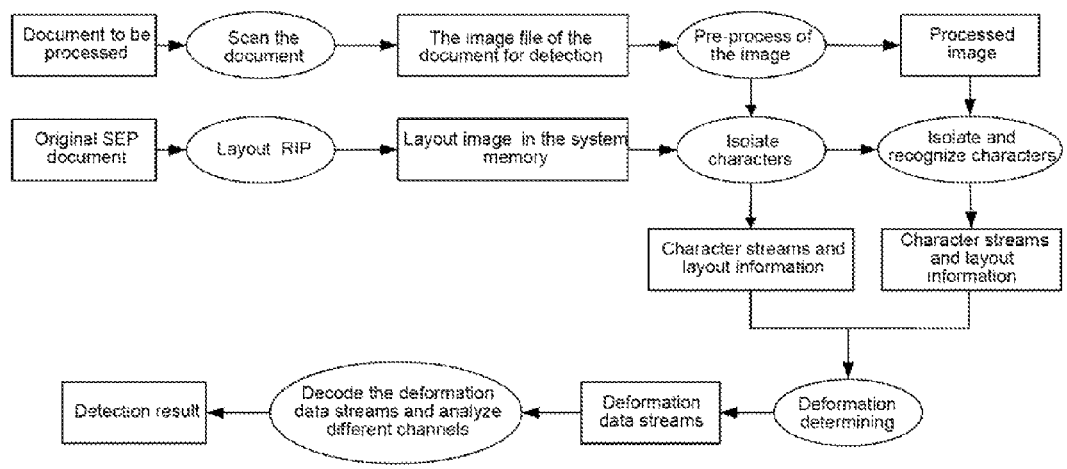
FIG. 4 is an example of a flow chart of the method provided for detecting hidden codes.

FIG. 4 is a flow chart of the method provided for detecting hidden codes. As shown in FIG. 4, the method for detecting hidden codes embedded into documents with the method shown in FIG. 3 includes the following steps.

Step 1: scan the document for detection to obtain an image file.

Step 2: rasterize the original document to an image without transformation, save the image of the original document in the system memory, and perform OCR on the image of the document for detection that is obtained in Step 1 as well as the image of the original document. The character codes and positions are obtained by recognizing and analyzing characters in the images with the OCR technique.

Step 3: process the OCR results to learn the relation between each character in the document for detection and corresponding character in the image of the original document in the system memory. In one embodiment, a fragment-matching algorithm is used to process the OCR results. The fragment-matching algorithm determines which part of the original document corresponds to the content of the document for detection, i.e., compares the document for detection with the original document and locates the corresponding parts.

Since the original document may be printed in an order different from the OCR order, a method similar to the fragment-matching algorithm can be adopted to obtain the relation between each character of the layout-based file for detection and the corresponding character in the image of the original document in the system memory. For example, when multiple documents are offered for detection, the method can be used for determining corresponding positions of the documents for detection in the original documents. In this way a correspondence between the original document used in the process of encoding and embedding and the documents for detection used in the process of decoding is established.

Step 4: identify the layout transformation of each character in the fragment of the document for detection, give a transformation number to each character, and determine the class of each transformation, for example:

Judge whether a character in the document for detection is subject to horizontal transformation and give a transformation number to the character accordingly, and regard the horizontal transformation as Channel 1;

Judge whether a character in the document for detection is subject to vertical transformation and give a transformation number to the character accordingly, and regard the vertical transformation as Channel 2;

Judge the font of a character in the document for detection with the OCR technique and give a font transformation number to the character accordingly, and regard the character font as Channel 3. The rest of the process can be deduced by analogy.

Step 5: obtain a statistical result for every bit of the hidden codes in each channel based on the known code length and the relation between each character in the fragment document for detection and the corresponding character in the original document.

In the coding process, a code sequence may be repeated several times in the whole document (the number of repeated code sequences can be calculated with the expression in Step 3 of the method for embedding), and a statistical result for every bit of the code sequence can be obtained accordingly.

Step 6: decode the codes obtained from the statistical results for each channel to get the identification for printing.

When a complete code sequence is obtained from the statistical results, the code sequence can be decoded directly to the identification of the electronic document for printing.

When an incomplete code sequence is obtained from the statistical results and the number of missing bits is within the capacity of error correction, the code sequence can also be decoded directly and the identification of the electronic document for printing is obtained by utilizing the error correction function of the BCH or RS code algorithm.

When an incomplete code sequence is obtained from the statistical results and the number of missing bits exceeds the capacity of error correction, all possible combinations of the missing bits are enumerated to form a possible code set and to further identify a possible identification set with the aid of the error correction codes. The error correction capacity of the redundant codes is limited in that only S bits among L bits of valid codes (S<L) can be restored by checking the redundant code; when the number of the missing bits is larger than S, the method described herein is adopted to get a possible identification set.

Step 7: summarize the identifications (IDs) calculated for all channels to get the printing ID of the document for detection, and further to determine to which copy of the original document the document or document fragment for detection belongs.

When the same identification is used for all channels, if the IDs calculated for all channels are identical to each other, the ID shall be the printing ID; if the Ds calculated for all channels are different from each other, the IDs for all channels shall be enumerated and the printing ID is selected from all Os manually based on the interference to the fragment.

When none of the channels provides a complete code sequence, an intersection of the possible ID sets of all channels is obtained as the most possible printing ID set. If it is suspected that the document ID generated from such process includes an error, a manual adjustment interface is called to manually modify the transformation numbers of some characters. Regardless of the layout transformation numbers given by the computer, the process will return to Step 5 when the manual adjustment is finished in order to obtain the printing ID.

In some embodiments, different channels may adopt a same identification or different identifications, and a document copy may have one or more embedded identifications.

In some embodiments, manual recognition and automatic recognition techniques are combined. Since a computer program may be unable to recognize some classes of character layout transformation automatically while a human operator can manually judge, by zooming in and comparing characters, whether layout transformation is applied to a character and which class of layout transformation is applied, errors in automatic recognition can be corrected and the reliability of the recognition process can be improved.

For a non-limiting example, an electronic document needs to be replicated into 9 copies and each of the copies shall have different embedded hidden codes to be distinguished from the others. Three classes of layout transformation shall be applied to characters in the document horizontal transformation, vertical transformation, and font transformation, which are regarded as 3 coding channels for embedding hidden codes into each copy of the document at the same time. In such case a character in a document copy may be subject to horizontal, vertical, and font transformations.

Channel 1 includes horizontal character layout transformation, which includes 3 levels: enlarged, unchanged, and shrunk;

Channel 2 includes vertical character layout transformation, which includes 2 levels: enlarged and unchanged; and Channel 3 includes character font transformation, which include 2 levels: Arial and Times News Roman.

Therefore, ternary codes are used for Channel 1 i.e., the channel for horizontal transformation coding, and binary codes are used for Channels 2 and 3, i.e., the channels for vertical transformation coding and font transformation coding, respectively.

According to the coding scheme expression $\lfloor \log N(M-1) \rfloor+1$, wherein M=9, and for the channel for horizontal transformation coding, N=3, therefore, the length of the code sequence for Channel 1 is calculated as follows: $\lfloor \log_3(9-1) \rfloor+1=2$, i.e., the coding scheme can be applied to maximally $3^2=9$ document copies. For the channels for vertical transformation coding and font transformation coding, N=2. Therefore, the length of the code sequences for Channels 2 and 3 is calculated as follows: $\lfloor \log_2(9-1) \rfloor+1=4$, i.e., the coding scheme can be applied to maximally $2^4=16>9$ document copies.

Since there are 9 document copies that need embedded hidden codes, the ternary codes embedded in Channel 1 are 00 (equal to 0 in the decimal system), 01 (1), 02 (2), 10 (3), 11 (4), 12 (5) 20 (6), 21 (7), and 22 (8); the binary codes embedded in channels 2 and 3 are 0000 (equal to 0 in the decimal system), 0001 (1), 0010 (2), 0011 (3) . . . 1000 (8). Code 0 in Channel 1 indicates unchanged, 1 indicates enlarged, and 2 indicates shrunk, and the codes 22 indicate that two neighboring characters are shrunk horizontally; code 0 in Channel 2 indicates enlarged, 1 indicates unchanged and the codes 0010 indicate that four neighboring characters are vertically enlarged, enlarged, unchanged, and enlarged, respectively; code 0 in Channel 3 indicates Arial, 1 indicates Times News Roman, and codes 0011 indicate that the fonts of 4 neighboring characters are Arial, Arial, Times News Roman, and Times News Roman.

Provided the document includes 16 characters, and redundancy coding is adopted, i.e., checking codes are added to the tails of valid codes, and assuming that the identification expressed by the hidden codes embedded into the 4th copy of the document is a decimal integer 3 (the identification expressed by the hidden codes embedded into the 1st copy of the document is a decimal integer 0), the codes embedded into each channel are as follows, and herein underlined characters are the checking codes.

Channel 1: 1001100110011001;
Channel 2: 00$\overline{11}$1100001$\overline{11}$100; and
Channel 3: 0011$\overline{11}$10000$\overline{111}$100.

The hidden codes in the 3 channels are all embedded into the 4th copy of the document, and a hard copy of the document with embedded hidden codes can be printed accordingly.

The process of embedding hidden codes is thus completed.

The following describes the process of detecting hidden codes.

Provided a fragment of one of the 9 hard copies of the document, into which hidden codes are embedded in the process described above, is obtained for detection, and the fragment is referred to as the document for detection hereafter, the following takes place:

The fragment is scanned fiat into a computer to be an electronic file, and the original electronic document without embedded hidden codes is called at the same time. The electronic files of the fragment and the original electronic document are processed with the OCR technique and the OCR results are compared with each other to determine the position of the fragment content in the original document.

Assuming it is determined that the content of the document for detection includes the 9th to 16th characters of the original document, the 8 characters shall be further analyzed horizontally, vertically, and with respect to the fonts to detect the hidden codes embedded in different channels.

Provided the analysis results of different channels are as follows:

Channel for horizontal transformation coding: enlarged, unchanged, unchanged, enlarged, enlarged, unchanged, unchanged, and enlarged;

Channel for vertical transformation coding: enlarged, enlarged, unchanged, enlarged, unchanged, unchanged, enlarged, and enlarged; and Channel for font transformation coding: Arial, Times News Roman, Times News Roman, Times News Roman, Arial, Arial, Arial, and Times News Roman.

Therefore, through comparison, it is determined that the embedded codes in the channels are:

Channel for horizontal transformation coding: 10011001
Channel for vertical transformation coding: 00101100; and
Channel for font transformation coding: 01111100.

Since it is recognized in the previous steps that the fragment content includes the 9th to 16th characters of the original document, the attributes and meaning of the codes in the channels can be learned based on the coding attributes of the channels (underlined characters are the checking codes):

Channel for horizontal transformation coding: 10 01 10 01;
Channel for vertical transformation coding: 00$\overline{10}$ 1$\overline{100}$; and
Channel for font transformation coding: 0111 $\overline{1100}$.

As various factors may interfere with the hi$\overline{dd}$en codes during the spread of the document hard copies, the original status of the codes can be restored based on the checking codes and the recognized codes.

The simplest checking code and checking method are used by the embodiment herein, i.e., judge whether the result of the XOR operation for each bit of the checking code and the original code is "1". It can be concluded by using such checking method that the embedded codes in the channel for horizontal transformation coding are intact while the 4th bit of the codes in the channel for vertical transformation coding and the 2d bit of the codes in the channel for font transformation coding are jammed.

Finally the corrected codes in the channels are obtained:
Channel for horizontal transformation coding: 10 (ternary)—3 (decimal);
Channel for vertical transformation coding: 0011 (binary)—3 (decimal); and
Channel for font transformation coding: 0011 (binary)—3 (decimal).

The identifications for the 3 channels are summarized, and it can thus be concluded that the 3 channels have a same identification (decimal value), i.e., the decimal integer 3.

According to the identifications assigned to different document copies, it can be concluded that the fragment belongs to the 4th of the 9 document copies.

The processes of generating, embedding, detecting, and analyzing hidden codes are thus completed.

The hidden codes generated and embedded into electronic documents mainly including characters, words, letters, strokes, or other lexical elements can hide a large amount of data, and yet are very robust and safe. The method for embedding and detecting hidden codes in electronic documents including mostly characters shows excellent performance in resisting interference and can tolerate various common interferences including duplicating, scanning, rubbing, soaking, blotting, cropping, and photographing with digital cameras.

The foregoing description of various embodiments of the claimed subject matter has been provided for the purposes of illustration and description. It is not intended to be exhaustive or to limit the claimed subject matter to the precise forms disclosed. Many modifications and variations rill be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

We claim:

1. A method for detecting hidden information embedded in a document comprising characters, wherein, a document for detection is formed by embedding hidden information in an original document by performing layout transformation on characters in the original document according to a predetermined embedding rule, and the method comprises:

determining layout transformation for each character in the document for detection compared with the original document;

obtaining a code sequence embedded in the document for detection based on the layout transformation of each character in the document for detection and the predetermined embedding rule;

decoding the code sequence to get the hidden information embedded in the document for detection;

wherein, the predetermined embedding rule comprises:

acquiring a code sequence for each class of layout transformation by coding the hidden information to be embedded in the class of layout transformation; wherein, each class of layout transformation is considered as a channel to embed the hidden information;

selecting the characters to be subjected to the layout transformation for each class of the layout transformation from the document respectively, length of the characters to be subjected to the layout transformation being larger than or equal to length of the code sequence corresponding to each class of the layout transformation;

performing the layout transformation on the selected characters according to the acquired code sequence for each class of the layout transformation in a cyclic application, each value in the code sequence for each class of the layout transformation corresponding to a transformation number of each class of the layout transformation.

2. The method according to claim 1, further comprising:
identifying each character in the document for detection and each character in the original document, and determining the corresponding relation between each character in the document for detection and each character in the original document before determining the layout transformation for each character in the document for detection according to an original document.

3. The method according to claim 2, wherein identifying each character in the document for detection and each character in the original document comprises:

performing Optical Character Recognition (OCR) on the document for detection and the original document; and
comparing the OCR results to obtain the corresponding relation between each character in the document for detection and a corresponding character in the original document.

4. The method according to claim 3, further comprising:
rasterizing the document for detection and the original document into an image file respectively before performing OCR on the document for detection and the original document.

5. The method according to claim 1, wherein decoding the code sequence to get the hidden information embedded in the document for detection comprises:
enumerating all possible code combinations for the missing bits to form a possible code sequence set; and decoding code sequences in the possible code sequence set to obtain a possible hidden information set, when there are missing bits in code sequence and the number of missing bits exceeds the error correction capacity.

6. The method according to claim 1, the predetermined embedding rule further comprises:
determining hidden information to be embedded in each class of layout transformation respectively.

7. The method according to claim 1, wherein obtaining a code sequence based on the layout transformation of each character in the document for detection and the predetermined embedding rule comprises:
obtaining the code sequence based on the known code length and the transformation number for the layout transformation of each character in the document for detection.

8. The method according to claim 1, wherein there is more than one class of layout transformation considered as channels to embed the hidden information separately; and different channels embed different or same hidden information independently.

9. The method for detecting according to claim 8, wherein there is more than one class of layout transformation considered as channels to embed the hidden information independently, and layout transformation in each class of layout transformation for each character is determined respectively and the code sequence in each class of layout transformation is also obtained respectively.

10. The method of claim 1, wherein, the class of layout transformation comprises: changes to the character size, character position in the page layout or the character font.

11. A device, which comprises a memory, and a processor in communication with the memory, wherein the memory stores instructions executable by the processor, and the instructions are to:
determining layout transformation for each character in the document for detection compared with the original document; wherein, a document for detection is formed by embedding hidden information in an original document by performing layout transformation on characters in the original document according to a predetermined embedding rule obtaining a code sequence embedded in the document for detection based on the layout transformation of each character in the document for detection and the predetermined embedding rule;
decoding the code sequence to get the hidden information embedded in the document for detection;
wherein, the predetermined embedding rule comprises:
acquiring a code sequence for each class of layout transformation by coding the hidden information to be embedded in the class of layout transformation; wherein, each class of layout transformation is considered as a channel to embed the hidden information;
selecting the characters to be subjected to the layout transformation for each class of the layout transformation from the document respectively, length of the characters to be subjected to the layout transformation being larger than or equal to length of the code sequence corresponding to each class of the layout transformation;
performing the layout transformation on the selected characters according to the acquired code sequence for each class of the layout transformation in a cyclic application, each value in the code sequence for each class of the layout transformation corresponding to a transformation number of each class of the layout transformation.

12. One or more computer memories collectively storing a rendered document data structure relating to a document comprising characters having an original layout, the data structure comprising information specifying the layout of the characters in the document, the specified layout differing from the original layout in a manner that encodes a hidden message in each class of layout transformation,
such that the specified layout can be compared to the original layout to discern the content of the hidden information;
wherein, the specified layout is obtained from the original layout by steps comprising:
acquiring a code sequence for each class of layout transformation by coding the hidden information to be embedded in the class of layout transformation: wherein, each class of layout transformation is considered as a channel to embed the hidden information;
selecting the characters to be subjected to the layout transformation for each class of the layout transformation from the document respectively length of the characters to be subjected to the layout transformation being larger than or equal to length of the code sequence corresponding to each class of the layout transformation;
performing the layout transformation on the selected characters according to the acquired code sequence for each class of the layout transformation in a cyclic application, each value in the code sequence for each class of the layout transformation corresponding to a transformation number of each class of the layout transformation.

* * * * *